United States Patent
Atohira et al.

(10) Patent No.: US 9,796,083 B2
(45) Date of Patent: Oct. 24, 2017

(54) SIMULATION APPARATUS FOR ROBOT SYSTEM

(71) Applicant: FANUC Corporation, Yamanashi (JP)

(72) Inventors: Hiroyuki Atohira, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/982,182

(22) Filed: Dec. 29, 2015

(65) Prior Publication Data

US 2016/0199981 A1 Jul. 14, 2016

(30) Foreign Application Priority Data

Jan. 14, 2015 (JP) .................... 2015-005069

(51) Int. Cl.
G06F 17/50 (2006.01)
B25J 9/16 (2006.01)
B25J 9/00 (2006.01)

(52) U.S. Cl.
CPC ........... *B25J 9/1605* (2013.01); *B25J 9/0093* (2013.01); *B25J 9/1671* (2013.01); *B25J 9/1682* (2013.01); *Y10S 901/09* (2013.01)

(58) Field of Classification Search
CPC ...... B25J 9/1605; B25J 9/1671; B25J 9/0093; B25J 9/1682; Y10S 901/09
USPC .......................................... 703/13
See application file for complete search history.

(56) References Cited

U.S. PATENT DOCUMENTS

| | | | | |
|---|---|---|---|---|
| 2005/0075752 A1* | 4/2005 | Ban | .................. | B25J 9/1697 700/213 |
| 2008/0301072 A1* | 12/2008 | Nagatsuka | ............. | B25J 9/1669 706/12 |
| 2009/0069939 A1* | 3/2009 | Nagatsuka | ............. | B25J 9/1671 700/258 |
| 2009/0187276 A1* | 7/2009 | Nagatsuka | ............. | B25J 9/1697 700/245 |
| 2015/0127148 A1 | 5/2015 | Koyanagi et al. | | |

FOREIGN PATENT DOCUMENTS

| | | |
|---|---|---|
| JP | H03-022106 A | 1/1991 |
| JP | 5-224734 A | 9/1993 |
| JP | 5-289736 A | 11/1993 |

(Continued)

OTHER PUBLICATIONS

A. Watanabe, S. Sakakibara, K. Ban, M. Yamada, G. Shen, "Autonomous Visual Measurement for Accurate Setting of Workpieces in Robotic Cells" FANUC Ltd. Jun. 11, 2007, 6 pages.*

*Primary Examiner* — Dwin M Craig
(74) *Attorney, Agent, or Firm* — Hauptman Ham, LLP

(57) ABSTRACT

A simulation apparatus includes: a robot model arranging unit that arranges a robot model on a virtual space; a configuration information storage unit that stores configuration information of a robot system; a transport device arrangement position calculating unit that calculates a transport device arrangement position based on a follow-up operation reference coordinate system related to a follow-up operation of a robot, included in the configuration information; and a detection unit arrangement position calculating unit that calculates a detection unit arrangement position based on the follow-up operation reference coordinate system.

9 Claims, 5 Drawing Sheets

(56) References Cited

FOREIGN PATENT DOCUMENTS

| | | |
|---|---|---|
| JP | 2772230 B2 | 7/1998 |
| JP | 2001-105359 A | 4/2001 |
| JP | 2003-150219 A | 5/2003 |
| JP | 2008-21092 A | 1/2008 |
| JP | 4056542 B2 | 3/2008 |
| JP | 2008-296330 A | 12/2008 |
| JP | 2009-70078 A | 4/2009 |
| JP | 2012-181574 A | 9/2012 |
| JP | 2013-136123 A | 7/2013 |
| WO | 2014/013609 A1 | 1/2014 |

* cited by examiner

SIMULATION APPARATUS FOR ROBOT SYSTEM

RELATED APPLICATIONS

The present application claims priority to Japanese Application Number 2015-005069, filed Jan. 14, 2015, the disclosure of which is hereby incorporated by reference herein in its entirety.

BACKGROUND OF THE INVENTION

1. Field of the Invention

The present invention relates to a simulation apparatus, which operates off-line, for a robot system including a robot, a hand and a detection unit that detects a workpiece.

2. Description of the Related Art

Some conventional techniques exist for performing a simulation of a robot system including a robot that performs a follow-up operation with respect to a workpiece using a hand, based on an output from a detection unit that detects a workpiece transported along a transport device In Japanese Registered Patent Publication No. 2,772,230, a control device of a transport device causes a model of the transport device to be moved by calculating an amount of movement of the transport device that moves a workpiece. A control device of a robot causes a model of the robot to be moved in synchronism with the amount of movement of the transport device based on a state of a model of a limit switch.

In Japanese Unexamined Patent Publication No. H3-22,106, a relative position of a robot with respect to a workpiece is modified in response to a movement instruction that causes the robot to perform a relative movement with respect to the workpiece. Then, movement teaching data of the robot is formed based on the position of the workpiece and the modified relative position of the robot.

In Japanese Registered Patent Publication No. 4,056,542, there are set up a reference point index, which becomes a reference point on a transport device, and an upstream end index and a downstream end index, which define a spatial range that ensures the safety of the robot operation, and these indexes are displayed at a relative position in response to an actual robot operating environment.

In Japanese Unexamined Patent Publication No. 2008-296,330, a gripping position of a workpiece gripped by a robot is calculated based on a position/orientation of the workpiece and the moving direction and the moving speed of the workpiece acquired by collating a still image acquired by a camera and a teaching model of the workpiece.

SUMMARY OF THE INVENTION

When investigating a cause of a failure that has occurred in an actual robot system and/or making a confirmation of and a modification to the operation of the actual robot system, it is necessary to form, on a simulation apparatus, a robot system having the same layout as the actual robot system. Further, when performing a simulation, it is necessary to make the various types of settings and the workpiece feeding method the same as those of the actual robot system.

However, in order to form the robot system having the same layout and/or make the various types of setting and the workpiece feeding method the same as those of the actual robot system, it is necessary to manually perform each operation while confirming one by one.

Such an operation is extremely cumbersome and takes an enormous amount of time. Thus, it is difficult to perform an accurate simulation of the actual robot system, and consequently, situations have also occurred in which the actual robot system has to be stopped for a long time.

The present invention has been made in view of such circumstances, and has for an object to provide a simulation apparatus for a robot system, which is configured to be able to accurately and easily investigate a cause of a failure occurred in the actual robot system and make a confirmation of and a modification to the operation of the actual robot system in a short time.

In order to achieve the foregoing object, according to a first invention, there is provided a simulation apparatus for a robot system including a robot that performs, based on an output from a detection unit that detects a workpiece transported along a transport device, a follow-up operation with respect to the workpiece using a hand, the simulation apparatus for the robot system including: a robot model arranging unit that arranges a three-dimensional robot model of the robot on a virtual space; a configuration information storage unit that stores configuration information of the robot system; a transport device arrangement position calculating unit that calculates a transport device arrangement position of the transport device on the virtual space based on a follow-up operation reference coordinate system related to the follow-up operation of the robot, included in the configuration information; and a detection unit arrangement position calculating unit that calculates a detection unit arrangement position of the detection unit on the virtual space based on the follow-up operation reference coordinate system.

According to a second invention, the simulation apparatus for the robot system according to the first invention further includes a workpiece feeding method determining unit that determines a workpiece feeding method based on information of the workpiece feeding method, which includes a feeding position, a feeding amount, and a feeding speed of the workpiece, included in the configuration information.

According to a third invention, the simulation apparatus for the robot system according to the first or second invention further includes a parameter setting unit that sets up a parameter for a model of the robot system based on parameter information of the robot system included in the configuration information.

According to a fourth invention, the simulation apparatus for the robot system according to any one of the first to third inventions further includes: a model storage unit that stores a plurality of three-dimensional transport device models of the transport device; a model selecting unit that selects one transport device model from the plurality of transport device models stored in the model storage unit; and a transport device model arranging unit that arranges the one transport device model selected by the model selecting unit at the transport device arrangement position calculated by the transport device arrangement position calculating unit.

According to a fifth invention, the simulation apparatus for the robot system according to any one of the first to fourth inventions further includes: a model determining unit that determines a three-dimensional detection unit model based on information of the detection unit included in the configuration information; and a detection unit model arranging unit that arranges the detection unit model determined by the model determining unit at the detection unit arrangement position calculated by the detection unit arrangement position calculating unit.

According to a sixth invention, the simulation apparatus for the robot system according to the fourth invention further includes: an arrangement reference coordinate system setting unit that sets up an arrangement reference coordinate system in which the transport device is arranged; a calculation unit that calculates an upstream side length from the follow-up operation reference coordinate system to an upstream end of the transport device and a downstream side length from the follow-up operation reference coordinate system to a downstream end of the transport device based on a follow-up operation upstream end and a follow-up operation downstream end of the follow-up operation of the robot in the follow-up reference coordinate system, included in the configuration information; and a changing unit that changes a width and a length of the transport device model based on the width of the transport device included in the configuration information and the upstream side length and the downstream side length of the transport device calculated by the calculation unit, wherein the transport device arrangement position calculating unit calculates the transport device arrangement position based on the follow-up operation reference coordinate system, the arrangement reference coordinate system, and the width, the upstream side length, the downstream side length and the origin of the transport device.

According to a seventh invention, the simulation apparatus for the robot system according to any one of the first to fifth inventions is configured such that the detection unit arrangement position calculating unit calculates the detection unit arrangement position based on a position of the detection unit in the follow-up operation reference coordinate system.

According to an eighth invention, the simulation apparatus for the robot system according to any one of the first to seventh inventions is configured such that when the robot system includes at least one additional robot that performs a follow-up operation with respect to the workpiece, the configuration information includes an additional follow-up operation reference coordinate system related to the follow-up operation of the additional robot, the simulation apparatus for the robot system further including: an additional robot arrangement position calculating unit that calculates an additional robot arrangement position of the additional robot on the virtual space based on the additional follow-up operation reference coordinate system and the follow-up operation reference coordinate system; and an additional robot model arranging unit that arranges a three-dimensional additional robot model of the additional robot on the virtual space based on the additional robot arrangement position.

According to a ninth invention, the simulation apparatus for the robot system according to the second invention further includes a simulation performing unit that performs a simulation of the robot system based on the arrangement position of the robot arranged by the robot model arranging unit, the detection unit arrangement position, the transport device arrangement position, the parameter information of the robot system included in the configuration information, and the workpiece feeding method determined by the workpiece feeding method determining unit.

The above objects, features, and advantages, as well as other objects, features, and advantages, of the present invention will be more clear based on the detailed description of exemplary embodiments of the present invention illustrated in the accompanying drawings.

DETAILED DESCRIPTION

Figure 1:
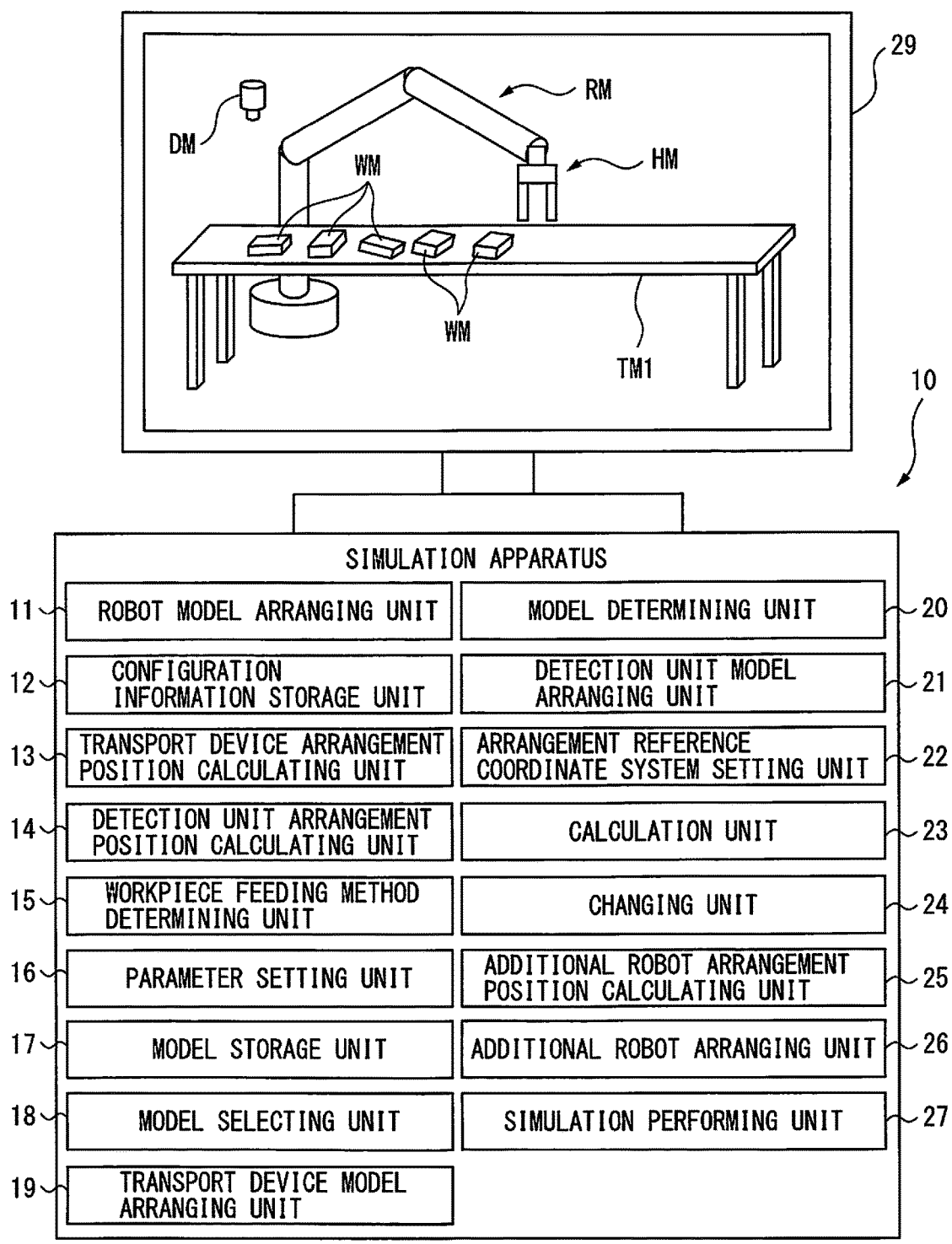
FIG. 1 is a functional block diagram of a simulation apparatus based on the present invention.

Embodiments of the present invention will be described with reference to the accompanying drawings hereinafter. In the drawings, like members are indicated by like reference numerals. In order to facilitate understanding, the scale size of the drawings has been changed arbitrarily.

FIG. 1 is a functional block diagram of a simulation apparatus based on the present invention. As surmised from FIG. 1, the simulation apparatus 10 performs a simulation of a robot system 1 including a robot R that performs a follow-up operation with respect to a workpiece W using a hand H, based on an output from a detection unit D that detects the workpiece W transported along a transport device T. The follow-up operation refers to an operation for gripping and taking the workpiece W, which is transported, from the transport device T and moving the workpiece W to a predetermined location other than the transport device. Further, let it be assumed that the transport device T is arranged along the direction of transportation of the workpiece.

The simulation apparatus 10 is a digital computer, and includes: a robot model arranging unit 11 that arranges a three-dimensional robot model RM of the robot R on a virtual space; and a configuration information storage unit 12 that stores configuration information of the robot system 1.

Further, simulation apparatus 10 includes: a transport device arrangement position calculating unit 13 that calculates a transport device arrangement position of the transport device T on the virtual space based on a follow-up operation reference coordinate system related to the follow-up operation of the robot R, included in the configuration information; and a detecting unit arrangement position calculating unit 14 that calculates a detection unit arrangement position of the detection unit D on the virtual space based on the follow-up operation reference coordinate system.

Further, the simulation apparatus 10 includes: a workpiece feeding method determining unit 15 that determines a workpiece feeding method based on information of the method for feeding the workpiece W, which comprises the feeding position, feeding amount and feeding speed of the workpiece W, included in the configuration information; and a parameter setting unit 16 that sets up a parameter for the model of the robot system 1 based on parameter information of the robot system 1, included in the configuration information.

Further, the simulation apparatus 10 includes: a model storage unit 17 that stores a plurality of three-dimensional transport device models TM1 to TM4 of the transport device T; a model selecting unit 18 that selects one transport device model from the plurality of transport device models TM1 to TM4 stored in the model storage unit 17; and a transport device model arranging unit 19 that arranges the one transport device model selected by the model selecting unit 18 at the transport device arrangement position calculated by the transport device arrangement position calculating unit 13.

Further, the simulation apparatus 10 includes: a model determining unit 20 that determines a three-dimensional detection unit model DM of the detection unit D based on the information of the detection unit U, included in the configuration information; and a detection unit model arranging unit 21 that arranges the detection unit model DM determined by the model determining unit 20 at the detection unit arrangement position calculated by the detection unit arrangement position calculating unit 14.

Further, the simulation apparatus 10 includes: an arrangement reference coordinate system setting unit 22 that sets up an arrangement reference coordinate system in which the transport device T is arranged; a calculation unit 23 that calculates an upstream side length from the follow-up operation reference coordinate system to an upstream end of the transport device T and a downstream side length from the follow-up operation reference coordinate system to a downstream end of the transport device T based on a follow-up operation upstream end and a follow-up operation downstream end of the follow-up operation of the robot R in the follow-up operation reference coordinate system, included in the configuration information; and a changing unit 24 that changes the width and the length of the transport device model TM based on the width of the transport device included in the configuration information, and the upstream side length and the downstream side length of the transport device T calculated by the calculation unit.

Meanwhile, let it be assumed that when the robot system includes at least one additional robot R' that performs a follow-up operation with respect to the workpiece W, the configuration information includes an additional follow-up operation reference coordinate system related to the follow-up operation of the additional robot R', which is represented by a relative position for the follow-up operation reference coordinate system. In such a case, the simulation apparatus 10 includes: an additional robot arrangement position calculating unit 25 that calculates an additional robot arrangement position of the additional robot R' on a virtual space based on the additional follow-up operation reference coordinate system and the follow-up operation reference coordinate system; and an additional robot model arranging unit 26 that arranges a three-dimensional additional robot model RM' of the additional robot R' based on the additional robot arrangement position.

Further, the simulation apparatus 10 includes a simulation performing unit 27 that performs a simulation of the robot system 1 based on the arrangement position of the robot R arranged by the robot model arranging unit 11, the detection unit arrangement position, the transport device arrangement position, and the parameter information of the robot system 1, included in the configuration information, and the workpiece W feeding method determined by the workpiece feeding method determining unit 15.

Further, the simulation apparatus 10 includes a display unit 29 that displays the robot model RM, the transport device model TM1, the detection unit model DM, and the three-dimensional workpiece model WM of the workpiece W on a virtual space. The transport device model TM1 illustrated in FIG. 1 is an example of the transport device model TM. In FIG. 1, a plurality workpiece models WM are depicted on the transport device model TM1. Let it be assumed that the workpiece models WM are moved on the transport device model TM1 from left to right as viewed in FIG. 1. Further, let it be assumed that the robot model RM includes a hand model HM.

Figure 2:
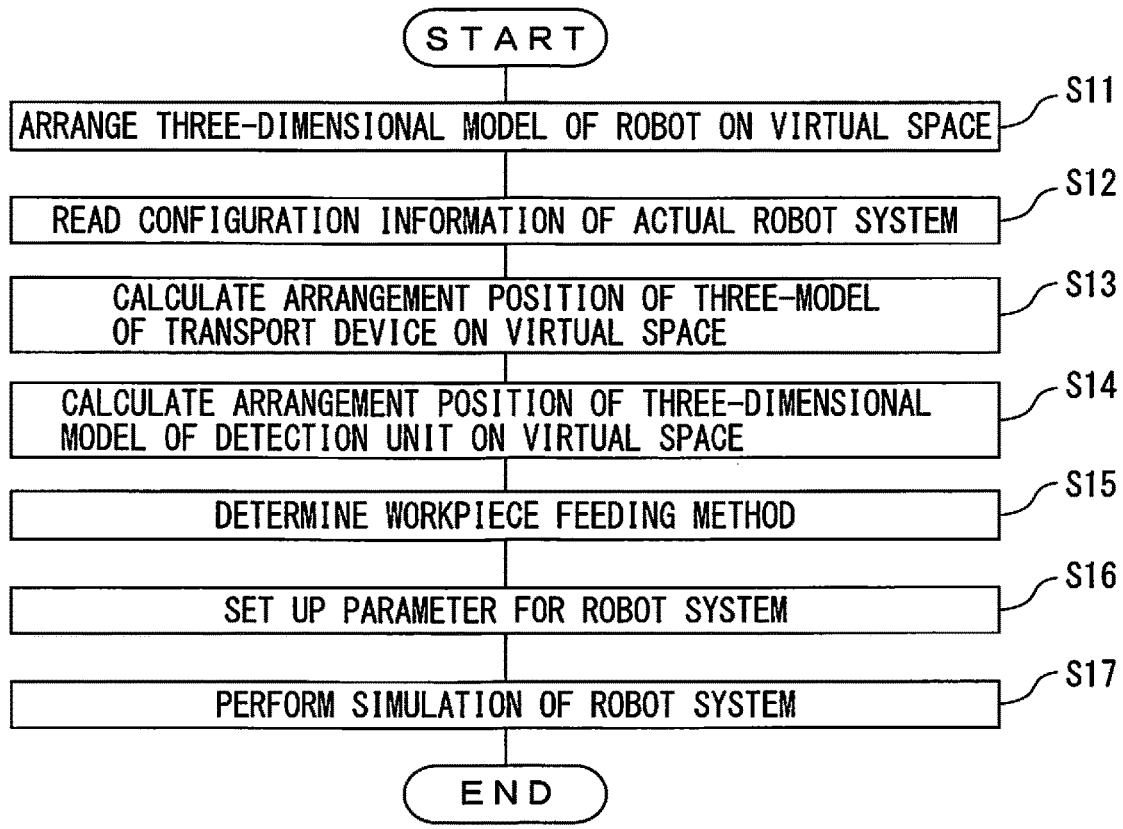
FIG. 2 is a flow chart illustrating the operation of the simulation apparatus illustrated in FIG. 1.

FIG. 2 is a flow chart illustrating the operation of the simulation apparatus illustrated in FIG. 1. The operation of the simulation apparatus of the present invention will be described with reference to FIGS. 1 and 2 hereinafter.

First, at step S11 of FIG. 2, the robot model arranging unit 11 arranges the robot model RM on a virtual space. The arrangement position of the robot model RM may be any position on the virtual space which is displayed on the display unit 29. Further, let it be assumed that a virtual space origin V0 is set in the virtual space.

Then, at step S12, the configuration information of the robot system 1, which is stored in the configuration information storage unit 12, is read in. The configuration information stored in the configuration information storage unit 12 is information formed based on the actual robot system 1. The configuration information includes the follow-up operation reference coordinate system of the robot R, the information of the method for feeding the workpiece W, the parameter information of the robot system 1, and other information, which will be described hereinafter.

Figure 3:
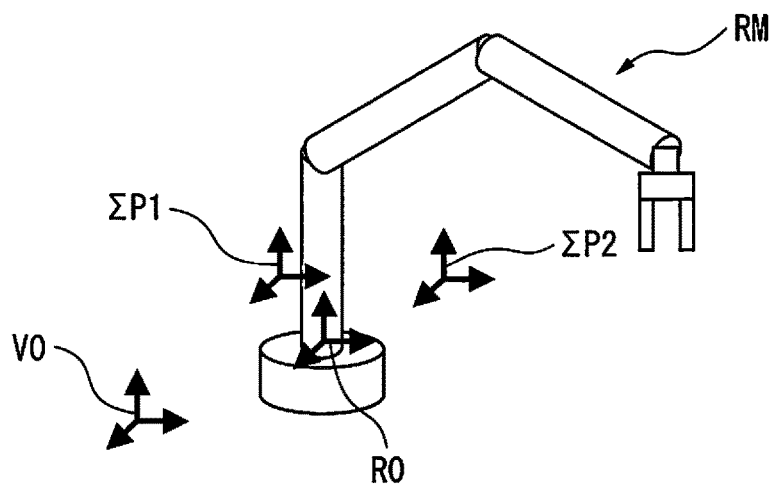
FIG. 3 is a view illustrating a robot model in a virtual space.

Then, at step S13, the transport device arrangement position calculating unit 13 calculates the transport device arrangement position of the transport device model TM on the virtual space, as follows. FIG. 3 is a view illustrating the robot model RM in the virtual space. In FIG. 3, there are depicted a virtual space origin V0, and a robot origin R0 which is determined depending on the virtual space origin V0 when the robot model RM is arranged at step S11. At step S13, the follow-up operation reference coordinate system $\Sigma P1$ included in the configuration information storage unit 12 is arranged at a predetermined position from the robot origin R0 on the virtual space.

The arrangement reference coordinate system setting unit 22 sets up an arrangement reference coordinate system $\Sigma P2$, which is the coordinate system for the transport device T, based on the follow-up operation reference coordinate system $\Sigma P1$. For example, the arrangement reference coordinate system $\Sigma P2$ is arranged at a predetermined position determined in accordance with the follow-up operation reference coordinate system $\Sigma P1$. Alternatively, the arrangement reference coordinate system $\Sigma P2$ may be arranged at a same position with the follow-up operation reference coordinate system $\Sigma P1$, the virtual space origin V0 or the robot origin R0.

Figure 4:
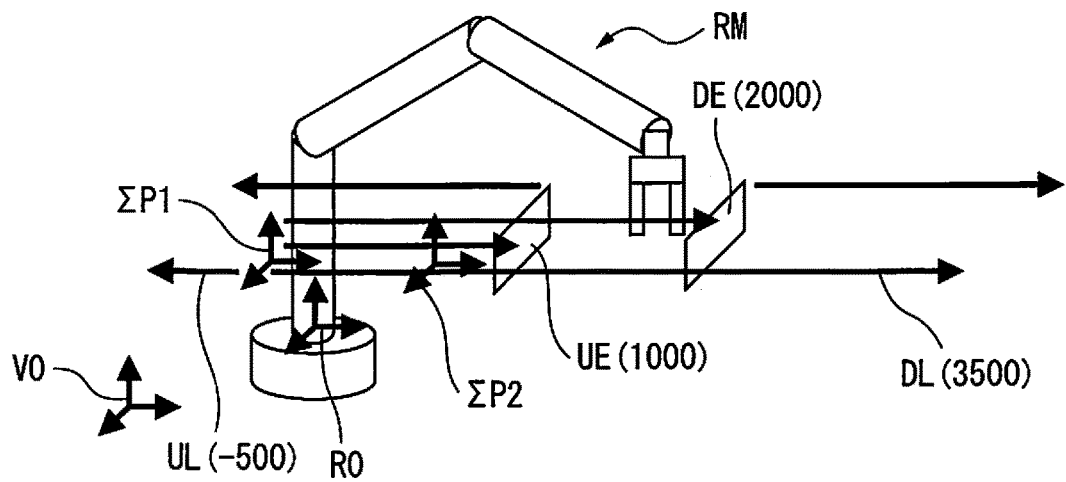
FIG. 4 is another view illustrating a robot model in a virtual space.

Meanwhile, the configuration information also includes the follow-up operation upstream end and the follow-up operation downstream end of the follow-up operation of the robot R with respect to the workpiece W. FIG. 4 is another view illustrating the robot model in the virtual space, wherein the follow-up operation upstream end UE and the follow-up operation downstream end DE are depicted. Let it be assumed that workpieces W not depicted in FIG. 4 are transported from left to right as viewed in FIG. 4. Let it be assumed that the robot R performs the follow-up operation only between the follow-up operation upstream end UE and the follow-up operation downstream end DE in the direction of transportation of the workpiece W.

As illustrated in FIG. 4, the positions of the follow-up operation upstream end UE and the follow-up operation downstream end DE in the direction of transportation are represented in terms of distances from the follow-up operation reference coordinate system ΣP1. In the example illustrated in FIG. 4, the follow-up operation upstream end UE is located at a position of 1000 from the follow-up operation reference coordinate system ΣP1, and the follow-up operation downstream end DE is located at a position of 2000 from the follow-up operation reference coordinate system ΣP1.

The calculation unit 23 calculates an upstream side length UL from the follow-up operation reference coordinate system ΣP1 to the upstream end of the transport device T (not illustrated in FIG. 4) and a downstream side length DL from the follow-up operation reference coordinate system ΣP1 to the downstream end of the transport device T, based on the follow-up operation upstream end UE and the follow-up operation downstream end DE. In the example illustrated in FIG. 4, let it be assumed that lengths of the follow-up operation upstream end UE and the follow-up operation downstream end DE plus predetermined lengths ±1500 are the upstream side length and the downstream side length, respectively. The upstream side length UL is −500, and the downstream side length DL is 3500. In other words, it may be said that the upstream side length UL and the downstream side length DL are the position of the upstream end and the position of the downstream end of the transport device T, respectively.

Figure 5:
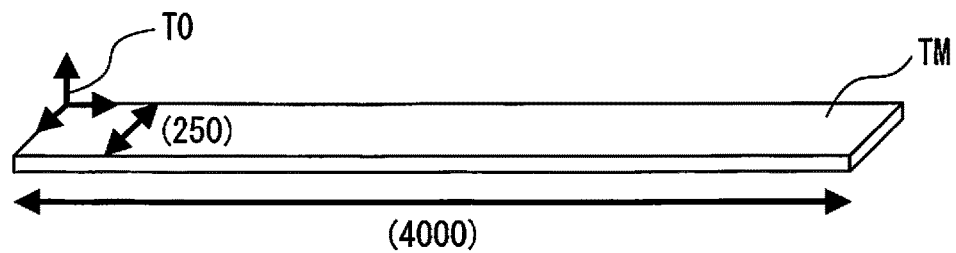
FIG. 5 is a view illustrating a transport device model in a virtual space.

Then, the changing unit 24 changes the size of the transport device model TM which is to be displayed on the display unit 29. First, the changing unit 24 determines the length of the transport device model TM in the direction of transportation based on the upstream side length UL and the downstream side length DL. In other words, the length in the direction of transportation of the transport device model TM is a sum of the upstream side length UL and the downstream side length DL. For example, in the view of FIG. 5 illustrating the transport device model in the virtual space, the length of the transport device model TM is 4000. The changing unit 24 determines the length of the transport device model TM in the direction of transportation as described above.

Then, the changing unit 24 changes the width of the transport device model TM, i.e., the length of the transport device TM perpendicular to the direction of transportation. The width of the transport device model TM is determined from the configuration information of the robot system 1, which is stored in the configuration information storage unit 12. In FIG. 5, the width of the transport device model TM is 250, and the changing unit 24 so determines the width of the transport device model TM. In FIG. 5, the transport device origin T0 of the transport device model TM is also depicted.

Then, the transport device arrangement position calculating unit 13 calculates the transport device arrangement position of the transport device model TM in the virtual space based on the follow-up reference coordinate system ΣP1, the arrangement reference coordinate system ΣP2, and the width, the upstream side length UL and the downstream side length DL of the transport device model TM.

Figure 6:
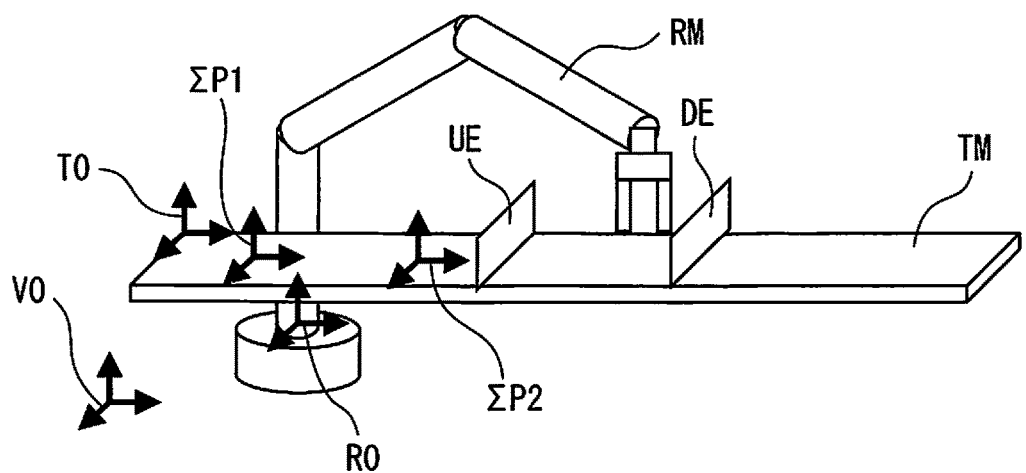
FIG. 6 is a view illustrating a robot model and a transport device mode in a virtual space.

FIG. 6 is a view illustrating the robot model and the transport device model in the virtual space. Each of the arrangement reference coordinate system ΣP2 and the robot origin R0 illustrated in FIG. 6 is located at a predetermined position from the virtual space origin V0. The follow-up operation reference coordinate system ΣP1 is calculated from the robot origin R0. The transport device origin T0, which is located at a predetermined position from the follow-up operation reference coordinate system ΣP1, is also calculated from the width, the upstream side length UL, and the downstream side length DL of the transport device model TM. In this manner, the transport device origin T0 as viewed from the arrangement reference coordinate system ΣP2 can be calculated. Thus, the transport device arrangement position of the transport device model TM in the virtual space can be calculated as the transport device origin T0 or a predetermined position from the transport device origin T0.

At step S13 of FIG. 2, it is not always necessary to arrange the transport device model TM per se on the virtual space as far as calculating the transport device arrangement position is concerned. In this regard, however, the transport device model TM may be arranged at the transport device arrangement position calculated by the transport device arrangement position calculating unit 13 using the procedure described below.

Figure 7:
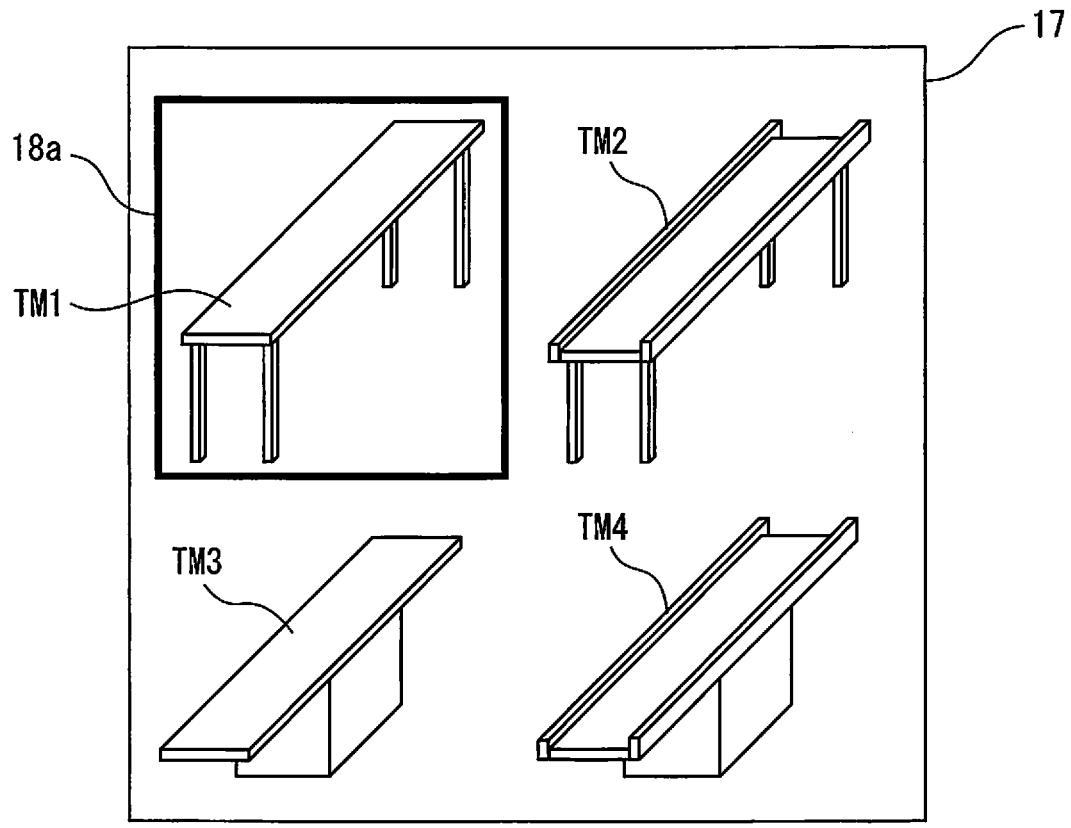
FIG. 7 is a view illustrating a model storage unit of the transport device model.

FIG. 7 is a view illustrating a model storage unit of the transport device model. Preferably, the content of FIG. 7 is displayed as a separate window on the display unit 29. As illustrated in FIG. 7, the plural types of transport device models TM1 to TM4 are stored in the model storage unit 17. A transportation path along which the workpiece is transported and a support structure that supports the transportation path are different in shape among the transport device models TM1 to TM4.

In FIG. 7, one transport device model TM1 is selected by a frame 18a. It is possible for the operator to select the other transport device models TM2 to TM4 by moving the frame 18a by operating the model selecting unit 18. When the one transport device model TM1 is selected in this manner, the transport device model arranging unit 19 arranges the transport device model TM1 at the above-described transport device arrangement position. In FIG. 1, the thus selected transport device model MT1 is displayed at the transport device arrangement position. It is possible for the operator to clearly know the content of the robot system 1 by arranging the transport device model TM1.

Referring again to FIG. 2, at step S14, the detection unit arrangement position calculating unit 14 calculates the detection unit arrangement position of the detection unit model DM on the virtual space as described below. The configuration information stored in the configuration information storage unit 12 includes a relative position of the actual detection unit D in the follow-up operation reference coordinate system ΣP1.

Figure 8:
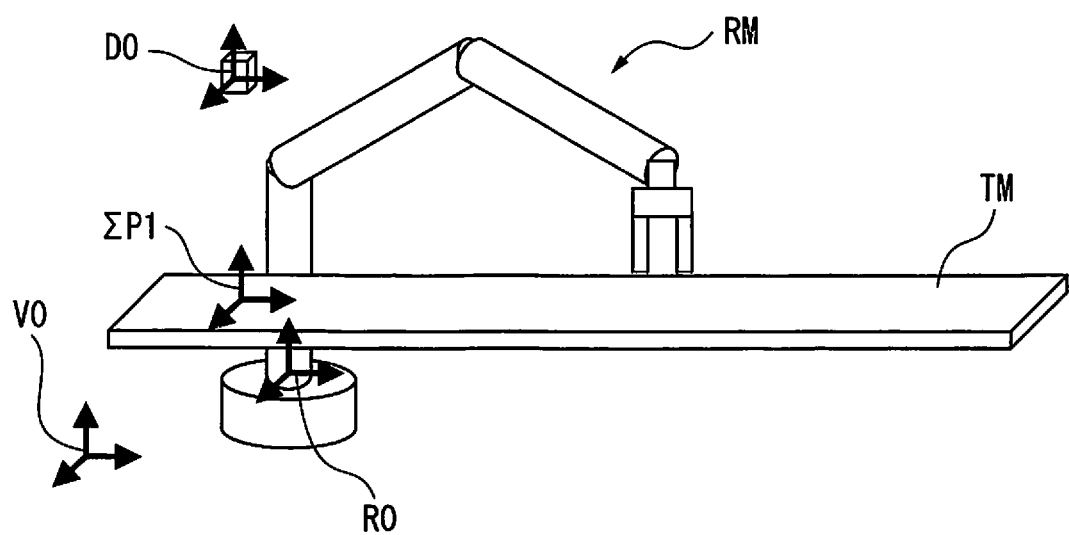
FIG. 8 is still another view illustrating a robot model in a virtual space.

FIG. 8 is still another view illustrating the robot model in the virtual space. The robot origin R0 in FIG. 8 is located at a predetermined position from the virtual space origin V0. The follow-up operation reference coordinate system ΣP1 as viewed from the virtual space origin V0 is calculated from the robot origin R0. Since the positional relationship between the follow-up operation reference coordinate system ΣP1 in the actual robot system 1 and the detection unit origin DO is included in the configuration information, the detection unit arrangement position in the virtual space is calculated as the detection unit origin DO or a predetermined position from the detection unit origin DO using the position of the actual detection unit D.

Meanwhile, at step S14 of FIG. 2, it is not always necessary to arrange the detection unit model DM per se on the virtual space as far as calculating the detection unit arrangement position is concerned. In this regard, the detection unit model DM may be arranged at the detection unit arrangement position calculated by the detection unit arrangement position calculating unit 14 using the procedure described below.

The configuration information stored in the configuration information storage unit 12 includes setting information of the detection unit. For example, when the detection unit D is a visual sensor, the setting information of the detection unit D includes focal distance, image size, lens distortion, pixel size, pixel aspect ratio, and so forth. The model determining unit 20 determines the three-dimensional detection unit model DM based on such setting information.

Figure 9:
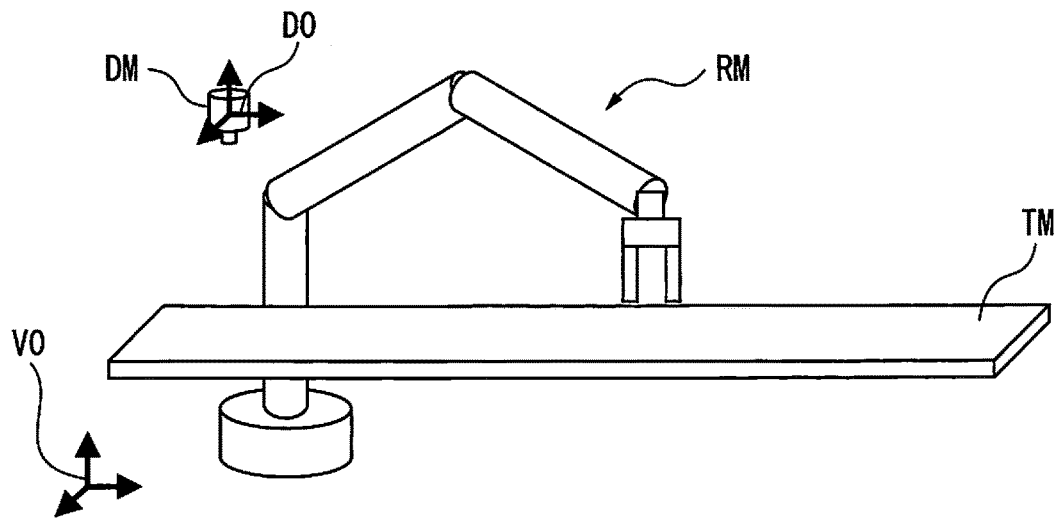
FIG. 9 is a view illustrating a robot model and a detector model in a virtual space.

Then, the detection unit model arranging unit 21 arranges the detection unit model DM determined by the model determining unit 20 at the detection unit arrangement position calculated by the detection unit arrangement position calculating unit 14. In FIG. 9, which is a view illustrating the robot model and the detection unit model in the virtual space, the thus determined detection unit model DM is arranged at the detection unit origin DO.

Referring again to FIG. 2, at step S15, the workpiece feeding method determining unit 15 determines the method for feeding the workpiece W. The configuration information includes information of the workpiece W feeding method, which comprises the feeding position, feeding amount, and feeding speed of the workpiece W. The workpiece feeding method determining unit 15 determines the feeding method of the workpiece W using such information.

Then, at step S16, the parameter setting unit 16 sets up the parameter for the model of the robot system. The model of the robot system refers to the model of the system in which the robot model RM performs the above-described follow-up operation in a virtual space. The parameter setting unit 16 reads the parameter information of the actual robot system 1, which is included in the configuration information. Such parameter information is standby position, standby time, input/output signal setting, register, position register setting, and the like of the robot, for example. The parameter setting unit 16 sets up the parameter for the model of the robot system based on such parameter information.

Then, at step S17, the simulation performing unit 27 performs a simulation of the robot system 1 based on the arrangement position of the robot R arranged by the robot model arranging unit 11, the detection unit arrangement position, the transport device arrangement position, the parameter information of the robot system 1 included in the configuration information, and the feeding method of the workpiece W determined by the workpiece feeding method determining unit 15.

Figure 10:
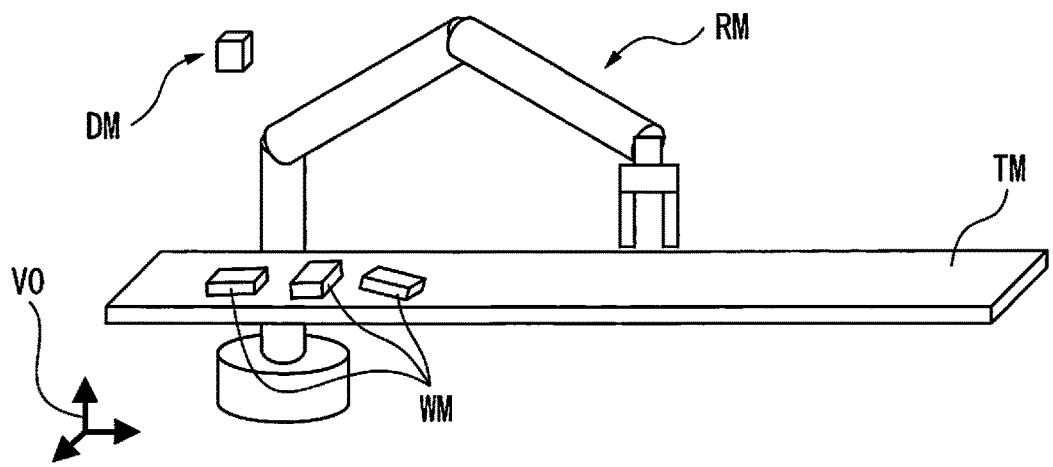
FIG. 10 is a view illustrating a model of a robot system in a virtual space.

FIG. 10 is a view illustrating the model of the robot system in a virtual space. As surmised from FIG. 10, the workpiece W transported on the transport device T is detected by the detection unit D. The robot R grips the workpiece W using the hand following up the workpiece W based on a detection result of the detection unit D. The simulation performing unit 27 performs a simulation of such a series of operations.

Thus, in the present invention, since the configuration information of the actual robot system 1 has been read in, a model of a robot system which has the same layout as the actual robot system 1 can be automatically created. In this manner, it is possible to accurately and easily investigate a cause of a failure occurred in the actual robot system 1 and make a confirmation of and a modification to the operation of the actual robot system 1 in a short time. Consequently, it is also possible to avoid a situation in which the actual robot system 1 cannot help but be stopped for a long time.

In the actual robot system 1, a case sometimes occurs in which the above-described follow-up operation is performed using the additional robot R' in addition to the robot R. In such a case, the configuration information of the robot system 1 includes an additional follow-up reference coordinate system related to the follow-up operation of the additional robot R', which is represented by a relative position with respect to the follow-up operation reference coordinate system $\Sigma P1$.

Figure 11:
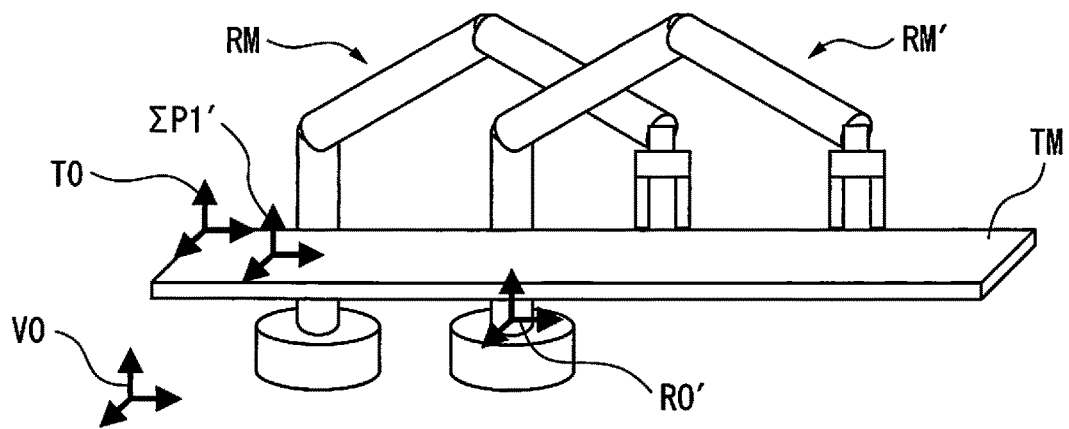
FIG. 11 is a view illustrating a robot model and an additional robot model.

FIG. 11 is a view illustrating the robot model and the additional robot model in a virtual space. As illustrated in FIG. 11, the additional robot origin R0' is sought as a predetermined position from the virtual space origin V0. The additional follow-up operation reference coordinate system $\Sigma P1'$ as viewed from the virtual space origin V0 can be calculated from the position of the additional robot origin R0'. Meanwhile, let it be assumed that the additional follow-up operation reference coordinate system $\Sigma P1'$ is in a predetermined positional relationship with the follow-up operation reference coordinate system $\Sigma P1$, and that the predetermined positional relationship is included in the configuration information. The additional robot arrangement position calculating unit 25 calculates the additional robot arrangement position of the additional robot R' on the virtual space based on the additional follow-up operation reference coordinate system $\Sigma P1'$ and the follow-up operation reference coordinate system $\Sigma P1$. Then, as illustrated in FIG. 11, the additional robot model arranging unit 26 arranges the three-dimensional additional robot model RM' of the additional robot R' at the additional robot arrangement position. From this, it will be appreciated that a simulation of the follow-up operation by the robot R and the additional robot R' can be performed with clarity.

Advantage of the Invention

In the present invention, a model of a robot system having the same layout as the actual robot system can be automatically formed. Thus, it is possible to accurately and easily investigate a cause of a failure occurred in the actual robot system and make a confirmation of and a modification to the operation of the actual robot system in a short time. Consequently, a situation can be avoided in which the actual robot system cannot help but be stopped for a long time.

While the present invention has been described using exemplary embodiments thereof, it will be appreciated by those skilled in the art that various other changes, omissions, and additions, besides the above-described changes, are possible without departing from the scope of the present invention.

What is claimed is:

1. A simulation apparatus for performing, based on an output from a detection unit that detects a workpiece transported along a transport device, a simulation of a robot system including a robot configured to perform a follow-up operation with respect to the workpiece, the simulation apparatus comprising a processor configured to:
   arrange a three-dimensional robot model of the robot in a virtual space,
   store configuration information of the robot system, which is formed based on the robot system,
   calculate a transport device arrangement position of the transport device in the virtual space based on a follow-up operation reference coordinate system, which is arranged at a predetermined position from the robot origin in the virtual space, related to the follow-up operation of the robot, and included in the configuration information, calculate a detection unit arrangement position of the detection unit in the virtual space based on the follow-up operation reference coordinate system, wherein the robot system includes at least one additional robot that performs a follow-up operation with respect to the workpiece, and the configuration information includes an additional follow-up operation reference coordinate system related to the follow-up operation of the additional robot, calculate an additional robot arrangement position of the additional robot in the virtual space based on the additional follow-up operation reference coordinate system and the follow-up operation reference coordinate system, and arrange a three-dimensional additional robot model of the additional robot in the virtual space based on the additional robot, wherein an operation of the robot system is modified based upon the arrangements of the three dimensional robot models.

2. The simulation apparatus for the robot system according to claim 1, wherein the processor is configured to determine a workpiece feeding method based on information of the workpiece feeding method comprising a feeding position, a feeding amount, and a feeding speed of the workpiece, included in the configuration information.

3. The simulation apparatus for the robot system according to claim 1, wherein the processor is configured to set up a parameter for a model of the robot system based on parameter information of the robot system, included in the configuration information.

4. The simulation apparatus for the robot system according to claim 1, wherein the processor is configured to:
store a plurality of three-dimensional transport device models of the transport device,
select one transport device model from the plurality of the stored transport device models, and
arrange the one transport device model selected at the calculated transport device arrangement position.

5. The simulation apparatus for the robot system according to claim 1, wherein the processor is configured to:
determine a three-dimensional detection unit model of the detection unit based on information of the detection unit, included in the configuration information, and
arrange the determined detection unit model at the calculated detection unit arrangement position.

6. The simulation apparatus for the robot system according to claim 4, wherein the processor is configured to:
set up an arrangement reference coordinate system in which the transport device is arranged,
calculate an upstream side length from the follow-up operation reference coordinate system to an upstream end of the transport device and a downstream side length from the follow-up operation reference coordinate system to a downstream end of the transport device based on a follow-up operation upstream end and a follow-up operation downstream end of the follow-up operation of the robot in the follow-up reference coordinate system, included in the configuration information,
change a width and a length of the transport device model based on the width of the transport device included in the configuration information, and the upstream side length and the downstream side length of the transport device, and
calculate the transport device arrangement position based on the follow-up operation reference coordinate system, the arrangement reference coordinate system, and the width, the upstream side length and the downstream side length of the transport device.

7. The simulation apparatus for the robot system according to claim 1, wherein the processor is configured to calculate the detection unit arrangement position based on a position of the detection unit in the follow-up operation reference coordinate system.

8. The simulation apparatus for the robot system according to claim 2, wherein the processor is configured to perform a simulation of the robot system based on the arrangement position of the robot, the detection unit arrangement position, the transport device arrangement position, the parameter information of the robot system included in the configuration information, and the determined workpiece feeding method.

9. The simulation apparatus for the robot system according to claim 1, wherein the follow-up operation includes an operation of gripping and taking the transported workpiece and moving the workpiece to a predetermined location other than the transport device.

* * * * *